(12) United States Patent
Chen et al.

(10) Patent No.: US 9,892,568 B2
(45) Date of Patent: Feb. 13, 2018

(54) METHOD AND SYSTEM FOR DETERMINING THE LIKELY OPERATING COST FOR A PARTICULAR TYPE OF VEHICLE OVER A DEFINED PERIOD

(71) Applicant: Innova Electronics, Inc., Irvine, CA (US)

(72) Inventors: Ieon C. Chen, Laguna Hills, CA (US); Michael Nguyen, Norwalk, CA (US); Robert Madison, Eastvale, CA (US); Keith Andreasen, Garden Grove, CA (US)

(73) Assignee: Innova Electronics Corporation, Irvine ( * ) Notice: Subject to any disclaimer, the term of this patent is extended or adjusted under 35 U.S.C. 154(b) by 269 days.

(21) Appl. No.: 14/200,459

(22) Filed: Mar. 7, 2014

(65) Prior Publication Data

US 2014/0188329 A1 Jul. 3, 2014

Related U.S. Application Data

(63) Continuation-in-part of application No. 13/589,532, filed on Aug. 20, 2012, now Pat. No. 9,177,428.

(51) Int. Cl.
*G07C 5/00* (2006.01)
(52) U.S. Cl.
CPC .................................. *G07C 5/008* (2013.01)
(58) Field of Classification Search
CPC ..................................................... G07C 5/008
USPC ............................................... 701/29.6, 31.9
See application file for complete search history.

(56) References Cited

U.S. PATENT DOCUMENTS

| | | | |
|---|---|---|---|
| 5,347,211 A | 9/1994 | Jakubowski | |
| D377,622 S | 1/1997 | Chen | |
| 5,635,841 A | 6/1997 | Taylor | |
| 5,758,300 A | 5/1998 | Abe | |
| 5,767,681 A | 6/1998 | Huang | |
| 5,809,437 A | 9/1998 | Breed | |
| 5,859,628 A | 1/1999 | Ross et al. | |
| 5,884,202 A | 3/1999 | Arjomand | |
| 6,000,413 A | 12/1999 | Chen | |
| 6,055,468 A | 4/2000 | Kaman et al. | |
| 6,094,609 A | 7/2000 | Arjomand | |
| 6,169,943 B1 | 1/2001 | Simon et al. | |
| 6,225,898 B1 | 5/2001 | Kamiya et al. | |
| 6,263,268 B1 | 7/2001 | Nathanson | |

(Continued)

*Primary Examiner* — Redhwan K Mawari
*Assistant Examiner* — Rodney P King
(74) *Attorney, Agent, or Firm* — Stetina Brunda Garred and Brucker (57) ABSTRACT

A method is disclosed for determining the cost of operating a vehicle over a defined period of time. The method proceeds by establishing, on a database, a schedule of anticipated future repairs for a plurality of vehicle types, the repair schedule including the cost of the repairs and the approximate mileage at which the anticipated future repair(s) are expected to become necessary. A processor, in communication with the database, receives information identifying a particular of vehicle, and the present mileage associated with that particular vehicle. Using the vehicle type information, the vehicle's present mileage information and the repair schedule, the processor then computes the approximate total future repair costs for maintaining the vehicle over a defined period of time.

32 Claims, 5 Drawing Sheets

(56) References Cited

U.S. PATENT DOCUMENTS

| | | |
|---|---|---|
| 6,389,337 B1 | 5/2002 | Kolls |
| 6,438,471 B1 | 8/2002 | Katagishi et al. |
| 6,499,385 B2 | 12/2002 | Protti |
| 6,535,112 B1 | 3/2003 | Rothshink |
| 6,587,768 B2 | 7/2003 | Chene et al. |
| 6,611,740 B2 | 8/2003 | Lowrey et al. |
| 6,650,318 B1 | 11/2003 | Arnon |
| 6,732,031 B1 | 5/2004 | Lightner et al. |
| 6,807,469 B2 | 10/2004 | Funkhouser et al. |
| 6,836,708 B2 | 12/2004 | Tripathi |
| 6,847,916 B1 | 1/2005 | Ying |
| 6,868,369 B2 | 3/2005 | Huang |
| 6,925,368 B2 | 8/2005 | Funkhouser et al. |
| 6,940,270 B2 | 9/2005 | Chen |
| D510,287 S | 10/2005 | Chen |
| 6,957,133 B1 | 10/2005 | Hunt et al. |
| 6,968,733 B2 | 11/2005 | Andreasen |
| 7,030,742 B2 | 4/2006 | Treadway |
| 7,085,680 B2 | 8/2006 | Huang |
| 7,116,216 B2 | 10/2006 | Andreasen |
| D334,560 S | 4/2007 | Wilson |
| 7,209,813 B2 | 4/2007 | Namaky |
| RE39,619 E | 5/2007 | Andreasen |
| D545,223 S | 6/2007 | Chen |
| D559,137 S | 1/2008 | Protti |
| D560,129 S | 1/2008 | Rich |
| D560,527 S | 1/2008 | Rich |
| D588,621 S | 1/2008 | Rich |
| 7,325,775 B2 | 2/2008 | Chen |
| D563,249 S | 3/2008 | Chen |
| 7,363,149 B2 | 4/2008 | Klausner et al. |
| D569,280 S | 5/2008 | Chen |
| 7,376,497 B2 | 5/2008 | Chen |
| D571,241 S | 6/2008 | Andreasen |
| 7,437,227 B2 | 10/2008 | Andreasen |
| D581,822 S | 12/2008 | Madison |
| 7,464,000 B2 | 12/2008 | Huang |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,603,293 B2 | 10/2009 | Chen |
| D610,586 S | 2/2010 | Chen |
| 7,734,390 B2 | 6/2010 | Chen |
| D624,446 S | 9/2010 | Chen |
| D624,838 S | 10/2010 | Chen |
| D625,209 S | 10/2010 | Chen |
| D625,210 S | 10/2010 | Chen |
| D625,634 S | 10/2010 | Chen |
| 7,904,219 B1 | 3/2011 | Lowrey et al. |
| 7,974,750 B2 | 7/2011 | Namaky |
| 8,005,759 B2 | 8/2011 | Hirtenstein et al. |
| 8,019,503 B2 | 9/2011 | Andreasen |
| 8,024,083 B2 | 9/2011 | Chen |
| D646,188 S | 10/2011 | Chen |
| D646,599 S | 10/2011 | Chen |
| 8,032,419 B2 | 10/2011 | Chen |
| 8,068,951 B2 | 11/2011 | Chen et al. |
| 8,301,329 B2 | 10/2012 | Andreasen |
| 8,306,687 B2 | 11/2012 | Chen |
| 8,370,018 B2 | 2/2013 | Andreasen et al. |
| 8,392,334 B2 | 3/2013 | Hirtenstein et al. |
| 8,630,765 B2 | 1/2014 | Chen |
| 2002/0128985 A1* | 9/2002 | Greenwald ............ G06Q 30/02 705/400 |
| 2002/0193925 A1* | 12/2002 | Funkhouser ......... G07C 5/0808 701/31.8 |
| 2003/0171111 A1 | 9/2003 | Clark |
| 2004/0110472 A1 | 6/2004 | Witkowski |
| 2007/0250229 A1* | 10/2007 | Wu ....................... G06Q 10/06 701/31.4 |
| 2008/0004764 A1 | 1/2008 | Chinnadurai et al. |
| 2008/0052216 A1 | 2/2008 | Johnson et al. |
| 2008/0249681 A1 | 10/2008 | Bertosa et al. |
| 2009/0062978 A1* | 3/2009 | Picard .................. G06Q 10/06 701/31.4 |
| 2009/0276115 A1 | 11/2009 | Chen |
| 2010/0211511 A1 | 8/2010 | Kawasaki |
| 2011/0153459 A1* | 6/2011 | Kirian ................... G06Q 10/06 705/26.82 |
| 2011/0224866 A1 | 9/2011 | Chen |
| 2011/0264322 A1 | 10/2011 | Chen |
| 2012/0010775 A1 | 1/2012 | Chen |
| 2012/0136527 A1* | 5/2012 | McQuade .............. G06Q 30/08 701/29.4 |
| 2012/0215398 A1 | 8/2012 | Chen |
| 2012/0271816 A1* | 10/2012 | Hansberger ........ G06Q 30/0623 707/722 |
| 2013/0018677 A1* | 1/2013 | Chevrette .............. G06Q 40/08 705/4 |
| 2013/0030870 A1 | 1/2013 | Swinson et al. |
| 2014/0046800 A1 | 2/2014 | Chen |
| 2014/0052328 A1 | 2/2014 | Nguyen |

\* cited by examiner

| | MILEAGE BRACKETS | | | | | | |
|---|---|---|---|---|---|---|---|
| | 0 - 5K MILES | 5K - 10K MILES | 10K - 15K MILES | 15K - 20K MILES | 20K - 25K MILES | 25K - 30K MILES | ... |
| COMPONENT 1 | 0 | 0 | 3 | 0 | 5 | 7 | ... |
| COMPONENT 2 | 0 | 1 | 1 | 2 | 0 | 5 | ... |
| COMPONENT 3 | 0 | 1 | 0 | 1 | 1 | 0 | ... |
| COMPONENT 4 | 1 | 2 | 1 | 3 | 2 | 4 | ... |
| COMPONENT 5 | 0 | 1 | 0 | 0 | 1 | 0 | ... |
| % TOTAL | COMP. 4 - 100% | COMP. 2 - 20%<br>COMP. 3 - 20%<br>COMP. 4 - 40%<br>COMP. N - 20% | COMP. 1 - 60%<br>COMP. 2 - 20%<br>COMP. 4 - 20% | COMP. 2 - 34%<br>COMP. 3 - 16%<br>COMP. 4 - 50% | COMP. 1 - 25%<br>COMP. 3 - 11%<br>COMP. 4 - 22%<br>COMP. N - 11% | COMP. 1 - 43%<br>COMP. 2 - 31%<br>COMP. 4 - 25% | ... |

COMPONENTS LIKELY TO FAIL

PREDICTIVE DIAGNOSTIC SUMMARY

| COMPONENT LIKELY TO FAIL | PROBABILITY OF FAILURE | | |
|---|---|---|---|
| | LOW | MEDIUM | HIGH |
| COMPONENT 1 | ▨ | | |
| COMPONENT 2 | ▨▨▨ | | |
| COMPONENT 3 | ▨▨▨▨▨▨ | | |

FIG. 4

METHOD AND SYSTEM FOR DETERMINING THE LIKELY OPERATING COST FOR A PARTICULAR TYPE OF VEHICLE OVER A DEFINED PERIOD

CROSS-REFERENCE TO RELATED APPLICATIONS

This is a continuation-in-part of U.S. patent application Ser. No. 13/589,532 filed on Aug. 20, 2012, for Predictive Diagnostic Calculation, the contents of which are incorporated herein by reference.

STATEMENT RE: FEDERALLY SPONSORED RESEARCH/DEVELOPMENT

Not Applicable

BACKGROUND

The present invention relates to a system and method of estimating future repair costs for a plurality of different types of vehicles, over a defined period.

Automotive repair is, for the most part, inevitable. If driven long enough, most automobiles will require at least some form of routine maintenance and repair. Although repairs are almost certain, it is unknown as to when the vehicle will fail and, therefore, automotive failure usually comes as a surprise. Furthermore, the average vehicle owner does not know what those failures are likely to be or what the related cost of repair would entail.

The difficulty in predicting repairs for a vehicle is complicated by the fact that different vehicles exhibit different vulnerabilities. As such, a particular component may be susceptible to failure in a particular vehicle, and not as susceptible to failure in another model of vehicle. Furthermore, that same component may have a different susceptibility of failure from one model year to the next in the same model of vehicle. Thus, there is not a universal template or formula that can be accurately applied to all vehicles for predicting when failure is likely to occur.

A consumer considering a purchase of a used vehicle can use different sources of information to evaluate the repair history and the general reliability of a vehicle. Services such as Polk®, CarFax®, AutoCheck® and others can provide information relating to a vehicle's title record, accident record, repair record, and other historical data. Information concerning the current diagnostic condition of a vehicle can be extracted from a vehicle by using a scan tool, to evaluate the current operating condition.

Information sources such as Consumer Reports® provide a general rating respecting the reliability of particular vehicles. However, that information does not provide a quantification of expected future repair costs over a defined period and does not identify particular repairs that are anticipated for specific vehicles, or the mileage at which those repairs are likely to become necessary. Consequently, the currently available information services, while useful to generally evaluate a vehicle, is insufficient to provide a specific quantification of the costs of purchasing and operating a particular type vehicle, having a specific mileage, over a defined period of time.

Accordingly, there is a need in the art for a method and system of determining the cost of maintaining a used vehicle over a defined period of time or mileage, where the vehicle identifying information and the vehicle's current mileage are the only information necessary to derive a baseline estimate of expected repair costs.

BRIEF SUMMARY

A method and system are provided for determining the cost of operating a vehicle over a defined period of time. The method proceeds by establishing, on a database, a schedule of anticipated future repairs and maintenance activities for a plurality of vehicle types, and the approximate mileage at which the anticipated repair(s) and other activity is expected to become necessary. A cost schedule for the anticipated future repairs is also established on the database. The repair and cost schedules may be based on a compilation of historical data accumulated over an extended period. A processor, in communication with the database, receives information identifying a particular type of vehicle and the present mileage associated with that particular vehicle. The processor then compares the vehicle identifying information and current mileage to the corresponding information stored on the database and computes the approximate total future repair costs for maintaining the vehicle over a defined period of time or mileage.

The defined period of time may be selected to commence upon the acquisition of a particular vehicle, and end on a future date. However, the defined period may start or end at any selected data. For example, the defined period may end when the vehicle reaches a selected future mileage.

In some implementations the method further includes refining the total future repair(s) cost by deducting the cost associated with any anticipated future repairs that have already been made, and adding the repair costs associated with the overdue repairs.

In other implementations a usage factor is considered in evaluating anticipated repairs and costs. The usage factor, e.g. normal or severe usage, may be representative of an expected vehicle operating environment and/or conditions of use during the defined period of time. The usage factor may be used to adjust the defined period of time, as the vehicle operating environment and conditions of use may have the effect of increasing or decreasing the wear and tear on the vehicle, as if the vehicle had been operating for a longer or shorter period of time. After the defined period of time is adjusted to take into account the usage factor, the total future repair costs may be recalculated.

The usage factor may be derived from or based on various information items, such as monitored driving habits, vehicle condition information, vehicle use information or vehicle location information and/or other information obtained from the vehicle or the intended driver of the vehicle. Monitored driving habits may be identified by use of a data acquisition and transfer device, or other usage detection device, such as a cellphone, accelerometer, GPS device, etc., connected to a vehicle diagnostic port, and left connected to collect data of a driver's driving habits over a prescribed period of time. The information stored on the data acquisition and transfer device, or an analysis/quantification thereof, may then be communicated to the processor. The data acquisition and transfer device may also be used to retrieve diagnostic information bearing on the identity or condition of a vehicle, e.g. identifying the vehicle make/model/year/engine, the current mileage of the vehicle, the presence of digital trouble codes (DTCs), and other diagnostic data, which may then also be communicated to the processor. As noted above, a mobile device, that does not connect to the vehicle diagnostic port, may also be used to derive usage information, e.g. based on location, driving habits, etc.

The data acquisition and transfer device may be implemented as a scan tool, a dongle, or any other device that may be in communication with the vehicle diagnostic system to receive, store and/or transfer information therefrom.

Other information that can be used to derive a usage factor may include the vehicle location information (e.g. whether the vehicle is likely to experience more extreme climate conditions), and the anticipated usage information (e.g. commercial use, or other uses requiring vehicles to routinely carry heavy loads).

Information respecting the type of vehicle and the present mileage associated with the vehicle may also be entered into a website associated with the processor by a person who can visually identify the type of vehicle (e.g. make, model, year and engine information) and the mileage on the vehicle. Vehicle condition information, location information and anticipate use information may also be input by the potential purchaser, or derived from information input by the potential purchaser.

Alternatively, vehicle type identifying information may be a vehicle identification number (VIN), which may be used to derive information such as the vehicle's make, model, year, and engine type. As noted above, information identifying the VIN and the current mileage of the vehicle may be retrieved from the vehicle's electric control unit (ECU) by means of a scan tool, dongle, or other data acquisition and transfer device that is connectable to the vehicle diagnostic port to collect the desired data. After the desired data is collected, the data acquisition and transfer device may be removed from the diagnostic port and put in electrical communication with to a personal computer (PC), smartphone, PDA, or other Internet communicable device, to transfer the information to an associated processor.

The schedule of the anticipated future repairs may be compiled from historical information respecting the actual repairs made to a plurality of different type of vehicles over an extended period of time, and the vehicle mileage at the time of each repair. The repair/mileage information may be correlated to the vehicle type identifying information, and may be accessed thereby.

Cost information may be derived from current cost schedules used by OEMs or by aftermarket auto repair facilities. Alternatively, cost information may be derived from the information respecting the prior repairs. However, historical cost information may not accurately reflect the current cost of repairs.

Accordingly, the present invention allows a person interested in potentially purchasing a used vehicle to access information indicating the total future repair cost for maintaining a vehicle over a defined period of time or mileage, by simply providing two pieces of information, i.e. vehicle identifying information and current mileage. As described above, the estimate of the total future repair costs may be refined by means of the above described adjustments and the application of the usage factor representative of expected vehicle operating conditions/present vehicle conditions, to provide a more detailed estimate.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The above description is given by way of example, and not limitation. Given the above disclosure, one skilled in the art could devise variations that are within the scope and spirit of the invention disclosed herein, including various ways of identifying and correlating vehicle type, VIN and mileage information with a repair and cost database. Further, the various features of the embodiments disclosed herein can be used alone, or in varying combinations with each other and are not intended to be limited to the specific combination described herein. Thus, the scope of the claims is not to be limited by the illustrated embodiments.

Figure 1:
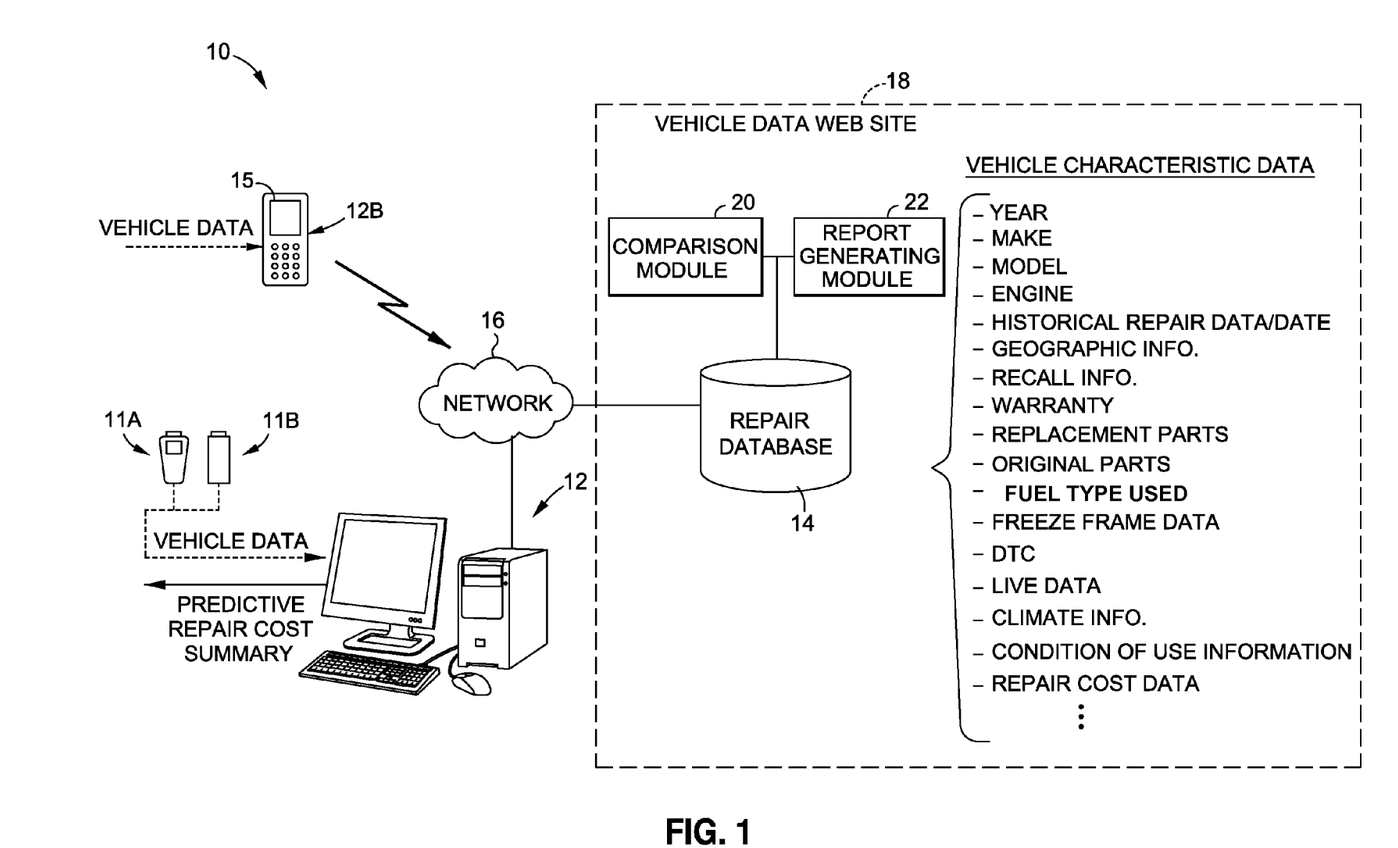
FIG. 1 is a schematic view of one embodiment of a predictive diagnostic system.
Figure 2:
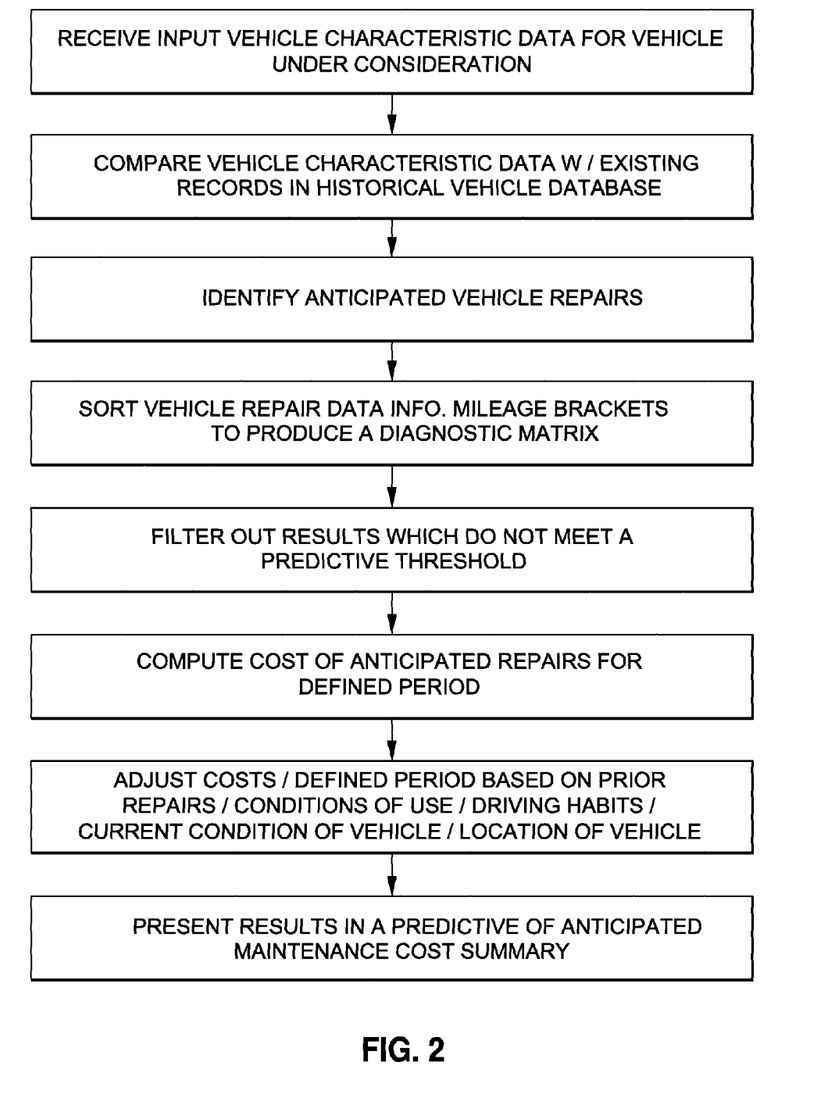
FIG. 2 is a flow chart listing one embodiment of a predictive diagnostic method.

Referring now specifically to FIG. 1, in the illustrated embodiment the repair diagnostic system 10 includes a data acquisition and transfer device, or other usage detection device, including but not limited to a scan tool 11A or dongle 11B an accelerometer, microphone or GPS device; an internet communicable device, such as computing device 12A or cellphone 12B; and a historical repair database 14 in operative communication with the internet communicable device through a network 16.

The database includes a schedule of repairs made to plurality of different types of vehicles and the mileage at which the repairs were made. Maintenance schedules and associated costs may also be included in the database 14. Database 14 may also include repair cost information. The internet communicable device 12 is operative to allow the user to input/upload to a processor vehicle identifying information, vehicle mileage and other information for the vehicle under consideration. The retrieval and upload of such information may be implemented manually or by use of various types of electronic devices. In this regard, the computing device 12 may be a desktop computer, laptop computer, tablet computer, smart phone, personal digital assistant (PDA) or other similar computing devices known by those skilled in the art. The historical repair database 14 may be accessible by the computing device 12A or 12B via a website 18 which may be a subscription based website or made available as a part of a vehicle service/warranty plan. Alternatively, the historical repair database may be loaded on the device 12A or 12B.

The user may visit or log on to the website 18 to upload the vehicle identifying information, mileage information and other data to the historical repair database 14, as will be described in more detail below. Alternatively, the vehicle identifying information may be uploaded to the website in an automatic manner. Information may be exchanged between the web site 18 and the computing device 12 via the network 16, which may include the internet, a local area network, or other communication systems.

The data acquisition and transfer device 11 may be used to interface with a vehicle onboard diagnostic port to retrieve information from the vehicle electronic control unit (ECU). The retrieved information may include data identifying the vehicle, or identifying characteristic features of the vehicle. In practice, the identifying information may be a vehicle identification number (VIN) from which the vehicle identifying information, e.g. make/model/year/engine type, etc. may be derived. The retrieved information may also include diagnostic information indicating the current mileage of the vehicle, and other diagnostic information indicating the operating condition of the vehicle, such as the presence of digital trouble codes (DTCs), monitor status data, live data, and other data indicative of the diagnostic condition of various vehicle systems.

The retrieved vehicle information may be communicated, by wired connection or a wireless communication system, such as Wi-Fi™ or Bluetooth™, from the vehicle data acquisition and transfer device 11 to an Internet communicable device, such as a personal computer (PC), cellphone, personal digital assistant (PDA) or similar device. The internet communicable device preferably includes a display, such as display 18 or display 15, which can provide the user with the visual summary of the anticipated repair costs.

The historical database 14 may be a comprehensive compilation of historical vehicle data where each entry into the database 14 relates to a repaired system or component repair of a specifically identified vehicle at a specific vehicle mileage. For the vehicle identifying information may include the year, make, model and engine of the vehicle. Therefore, to determine the predictive repairs for the vehicle under consideration, the vehicle identifying information and current mileage associated with the vehicle under consideration is entered into the repair database 14 and the historical repair data is matched with vehicle identifying information and mileage in the database to identify and to determine the likelihood of repairs within a certain period or mileage range.

The failures/repairs listed in the historical repair database 14 may be identified according to several different strategies. In one embodiment, the anticipated repair schedule is derived from the actual repairs performed at repair shops throughout the country. In another embodiment, the anticipated repair schedule can be based on or include consideration of claims submitted to insurance companies. Accordingly, the repair database 14 may be constructed according to any of the strategies listed above, or combination thereof, according to other means commonly known by those skilled in the art.

The system 10 further includes a comparison module 20 and a report generating module 22 in operative communication with each other and the repair database 14. The comparison module 20 includes a processor that is operative to match the vehicle identifying data, associated with the vehicle under consideration, with similar data found in the database 14 to identify repairs which have occurred in those matching vehicles. The report generating module 22 is operative to compile the results and generate the predictive repairs report, which may be presented to the user. Anticipated repair costs may be similarly segregated into high probability/median probability/low probability costs.

The following example illustrates benefits which the predictive repair system 10 provides. In this example, the vehicle under consideration is a 2005 HONDA™ ACCORD™ although it is understood that the predictive repair system 10 may be used with any vehicle. The repair database 14 includes several entries related to a 2005 HONDA™ ACCORD™. Based on those entries, an owner of a 2005 HONDA ACCORD can determine the likelihood that his vehicle will experiences problems at certain mileage ranges. For example, between 75,000 and 100,000 miles, there may be a high likelihood that the owner may need to replace the ignition coil, a median probability or likelihood that the user will need to replace the camshaft position sensors, and a low probability that the owner will need to replace the engine cooling module.

The information in database 14 may also include vehicle condition information, or information concerning the geographic area (state, city, zip code, etc.) or climatic conditions in which the vehicle is primarily driven. Vehicles in different geographic areas may encounter symptoms related to the geographic area in which the vehicle is driven. For instance, vehicles driven in the northern part of the United States regularly encounter snow in the winter months. Road maintenance crews in those areas of the country regularly spread salt on the roads to mitigate slippery road conditions. Thus, as the vehicle drives over the salted roads, the undercarriage of the vehicle may be exposed to the salt, which may cause rust/corrosion or may lead to other problematic conditions.

However, vehicles driven in warm weather states may not be susceptible to the same problems since those vehicles are generally not driven over salted roads. However, other geographic locations offer different environmental conditions which may be problematic for the vehicle, i.e., desert areas may lead to engine overheating. Therefore, the geographic location in which the vehicle under consideration is driven may lead to a more accurate and precise predictive repairs. Exemplary components/devices which may be climatically or geographically sensitive include may include the vehicle's muffler, body panel (susceptible to rust), radiator, battery, door lock, and starter.

Other data which may be entered into the historical database 14 is recall information, usage information (e.g., how many miles the vehicle is driven per year), warranty information, replacement parts on the vehicle, original parts on the vehicle, fuel used, maintenance records. Thus, the data entered into the repair database 14 allows the user to obtain matches with records that not only are for the same or similar to the vehicle under consideration, but were also operated and maintained in a similar fashion.

Figure 3:
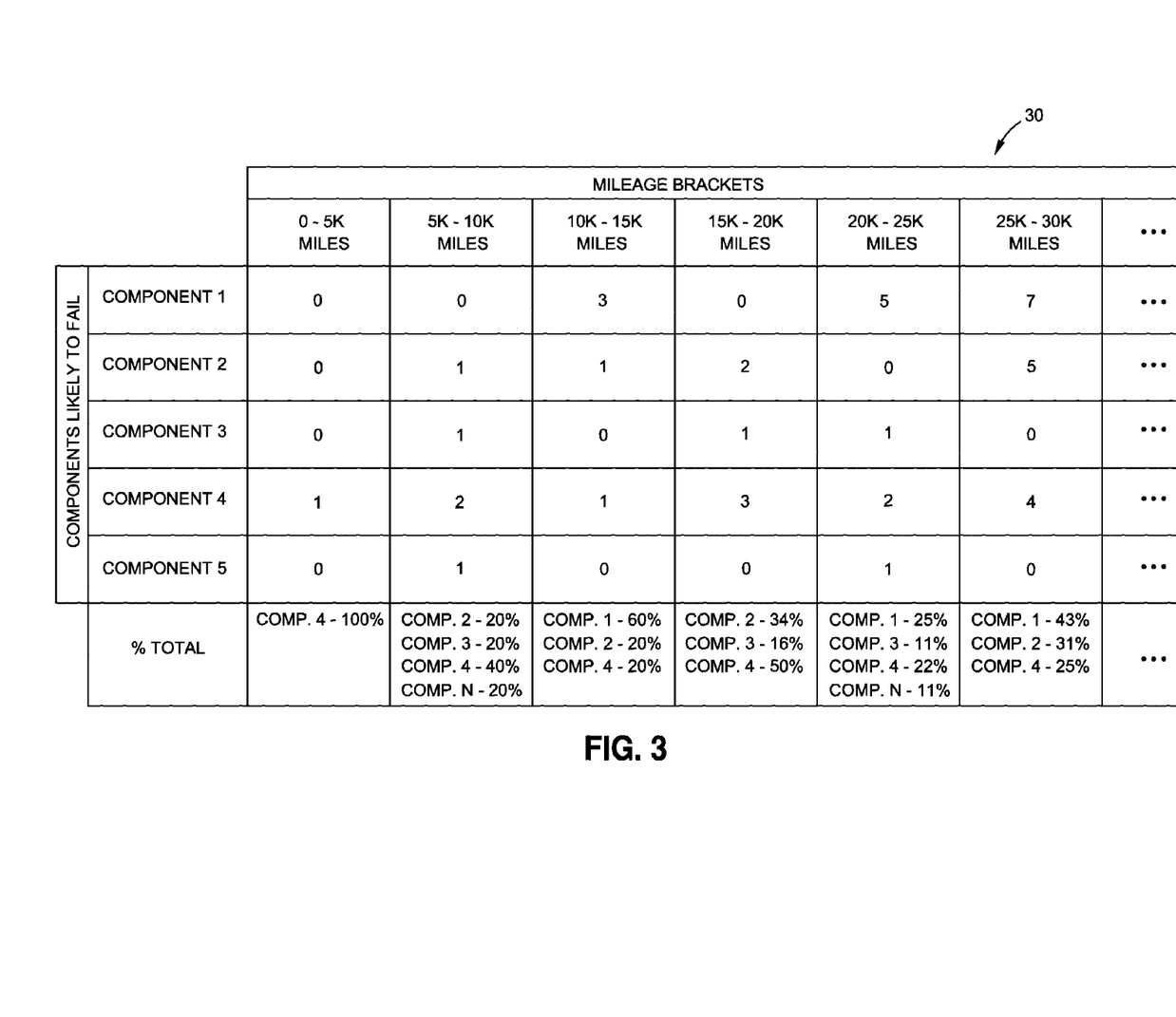
FIG. 3 is one embodiment of a preliminary diagnostic matrix.

According to one embodiment, and referring now specifically to FIG. 3, after the vehicle characteristic data is entered into the repair database 14, a preliminary diagnostic matrix 30 will be generated which shows the predicted components/systems that are likely to fail along one axis, and several mileage brackets along another axis. The body of the matrix 30 is filled with the number of failures associated with the respective components/systems occurring in each mileage bracket for the respective components.

The number of historical failures may then be totaled for each component within each mileage bracket to determine a percentage of failure (see bottom row of matrix 30). For instance, as shown in the example depicted in FIG. 3, there was only 1 failure within the 0-5,000 mile bracket, with that sole failure being attributable to Component 4. Thus, Component 4 comprises 100% of the failures in the 0-5,000 mileage bracket. In the 5,000-10,000 mileage bracket, there were 5 total failures, with one being attributable to Component 2, one being attributable to Component 3, two being attributable to Component 4 and one being attributable to Component 5. Thus, Component 2 comprises 20% of the failures, Component 3 comprises 20% of the failures, Component 4 comprises 40% of the failures and Component 5 comprises 20% of the failures. This totaling process is completed to determine the percentage of failure for the components failing in each mileage bracket.

In one implementation, the predictive repair system 10 may filter out results which do not meet or exceed a defined threshold. In this regard, it is desirable to only report failures which are believed to be representative of a pattern and thus indicative of a probable outcome in the future. If there are only a minimum number of failures, i.e., failures below the set threshold, such a minimum number of failures may not be a reliable data-set for representing a potential failure in the future. The threshold may be selectively adjusted by the system operator, or by the user. The threshold may be low for newer vehicles, since there is generally less data associated with the new vehicles, and high for older vehicles, since there is generally more data associated with the older vehicles.

Referring again to FIG. 3, a threshold of two (2) may be set to filter out all failures that only occur once. Therefore, applying the threshold to the matrix 30, there are no failures that satisfy the threshold in the 0-5,000 mile bracket, only two failures (Component 4) that satisfy the threshold in the 5,000-10,000 mile bracket, three failures (Component 1) that satisfy the threshold in the 10,000-15,000 mile bracket, five failures (Components 2 and 4) that satisfy the threshold in the 15,000-20,000 mile bracket, seven failures (Components 1 and 4) that satisfy the threshold in the 20,000-25,000 mile bracket, and sixteen failures (Components 1, 2, and 4) in the 25,000-30,000 mile bracket.

The matrix 30 may further be beneficial to identify clusters of failures at certain mileage points. For instance, with regard to Component 1 listed in the example matrix, there are three failures between 10,000-15,000 miles and five failures between 20,000-25,000 miles, although there are zero failures in the intermediate mileage bracket (i.e., 15,000-20,000 miles).

After the thresholds have been applied, the overall percentages may be recalculated to determine the percentage of failures within each mileage bracket that meet the threshold.

Figure 4:
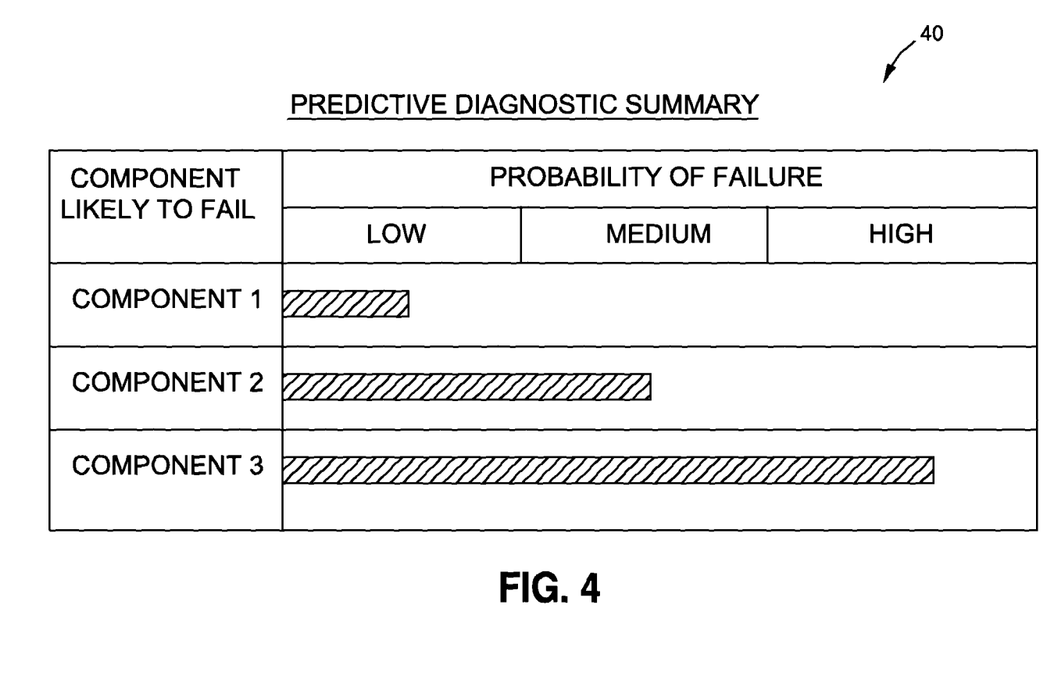
FIG. 4 is a one embodiment of a predictive diagnostic report.

The results may be presented to the user in a user friendly summary 40. FIG. 4 shows an exemplary predictive repair summary 40 which displays each component and the likelihood of failure associated with each component. In the preferred embodiment the likelihood of failure is based on studies involving a group of vehicles of like year/make/model/engine, through a defined mileage range. The likelihood of failure is represented as either being LOW, MEDIUM, or HIGH. A LOW likelihood of failure may be associated with 0-30% chance of failure, a MEDIUM likelihood of failure may be associated with 30%-60% chance of failure, while a HIGH likelihood of failure may be associated with a 60%-100% chance of failure. It is also contemplated that the probability of failure may be presented in numerical terms, i.e., the actual likelihood of failure percentage associated with that component. The chances of failure listed above with each likelihood of failure are exemplary in nature only and are not intended to limit the scope of the present invention.

As previously described, the predictive repair system 10 is also functional to derive the likely cost for such repairs, and the mileage that the repair is likely to become necessary.

According to one implementation of the present invention, the predictive repair analysis may be refined based on prior repairs made or not made to the vehicle. For example, where a component is predicted to fail within a defined period, but has already been replaced, the cost for repairing such component may be deducted from the anticipated future repair costs. Conversely, where a component was expected to fail prior to commencement of the defined period, but did not fail, the component may then be expected to fail during the defined period, and the cost of such repair would be added to the anticipated future repair costs.

According to another implementation of the present invention, the predictive repair analysis may also be refined based on specific diagnostic history of the vehicle under consideration. In other words, the system 10 may also be capable of adjusting the anticipated future repair costs for the vehicle under consideration based on vehicle condition information received from the vehicle, such as live data. The information extrapolated from the baseline predictive repair summary may be cross-referenced with live data and/or other diagnostic data, e.g. digital trouble codes, to provide a more accurate prediction as to the remaining lifespan of that component. For instance, live data valves may be compared to DTC valves and known DTC failures. Degradation of live data valves can be tracked and associated to symptom based failures. If the live data shows a relatively healthy component, the prediction of 5,000 miles before a likely failure may be increased. Conversely, if the live data shows a relatively worn or ineffective component, the prediction of 5,000 miles before a likely failure may be decreased. The predictive repair method may also include correlating one part failing in response to another part failing, in the past or future. More specifically, one part or component which wears out may have a cascading effect on wearing out other parts or components, particularly other parts or components within the same vehicle system. Thus, there may be a system level correlation when one part has failed in the past or is likely to fail during the defined period.

In further embodiments, the predictive repair analysis may be adjusted in view of other usage factors, such as climate conditions, road conditions, recalls, anticipated annual mileage, commercial uses or driving habits of the driver. Such usage factors may be accommodated by direct adjustments to the anticipated repair costs, or by adjustments to the defined period, which in turn results in adjustments to the repair costs. For example, where such usage factors indicate that the vehicle is likely to experience greater than usual wear and tear, the mileage or the time period encompassed within the defined period may be extended by a representative amount, thereby incorporating additional wear and tear into the defined period. Geographic differences in repair charges may also be factored into determination of anticipated repair cost.

As noted above, the usage factor may also include data such as the driving habits of the principal driver. Such driving habits may captured by connecting a dongle, or a similar device, to the diagnostic port of a vehicle that the driver commonly drives, and recording information such as speed habits, acceleration habits, breaking habits, etc. Such information is commonly used by insurance companies to rate the driver and derive the corresponding insurance cost. The same information, if available at the time of the predictive repair analysis is performed, may be used to adjust the anticipated repair costs, as described herein. As noted above, usage information may also be provided by a variety of different devices, e.g. accelerometers, GPS devices, cellphones, etc., which are not connected to the vehicle diagnostic port.

As it will be apparent to those skilled in the art, various techniques may be used to quantify and apply usage factors to adjust the total cost of the anticipated repairs, or to adjust the defined period without departing from the broader aspects of the present invention. For example, location information may have little effect on the predictive repairs over the defined time, or on the overall repair costs, particularly where the operating climate is not associated with extreme climate conditions. Vehicle condition data is likely to have more of an impact on the anticipated repairs and costs where the vehicle the diagnostic information indicates that difficulties with relatively expensive vehicle systems are common, but less of a factor where the diagnostic information indicates that only normal, inexpensive repairs are common during the period of interest. Adjustments in response to the anticipated annual mileage expectations may be made in proportion to the extent that the anticipated annual mileage varies from the average mileage in the historical database for the same time period. Anticipated commercial uses are likely to require evaluation of the particular commercial use that is anticipated, and the pattern of anticipated repairs that follow shortly after the conclusion of the defined period of time. The more repairs that are expected to follow shortly after the conclusion of the defined period of time, the greater the impact of the usage factors that have the effect of accelerating such repairs.

Thus, the system 10 may conduct an iterative analysis of the data retrieved from the vehicle to more accurately predict the likelihood of failure. The iterations include initially generating the baseline diagnostic report from basic characteristic data, i.e., year, make, model. Then the prediction may be refined based on the retrieved data supplied to the system 10. In this regard, the likelihood of failure may be increased, decreased, or remain unchanged based on the retrieved data.

Figure 5A:
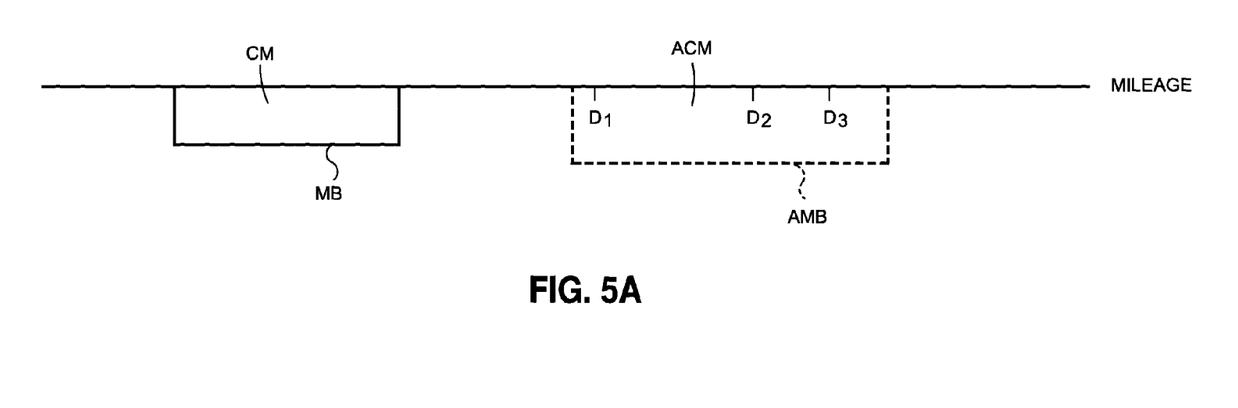
FIG. 5A is a schematic view of adjusting a mileage bracket to identify repairs within an adjusted mileage bracket.

Referring now specifically to FIGS. 5A, there is shown a schematic view of an adjustment made based on information received from the vehicle. In FIG. 5A, the current mileage "CM" of the vehicle under consideration is identified on a mileage axis. A mileage bracket "MB" is defined along the mileage axis, wherein the mileage bracket MB includes the current mileage CM. The mileage bracket MB may extend from a mileage less than the current mileage CM to a mileage more than the current mileage CM. For instance, the mileage bracket MB may extend for 10,000 miles, and extend from 2,500 miles less than the current mileage CM, to 7,500 more than the current mileage CM. Those skilled in the art will readily appreciate that the upper and lower bounds to the mileage bracket MB may be selectively adjusted as desired by the user.

After vehicle information is analyzed, the current mileage "CM" may be adjusted to define an adjusted current mileage "ACM." For instance, if the vehicle was driven off-road, in harsh conditions, etc., the vehicle may have endured "hard miles." Thus, the current mileage CM for the vehicle may be increased to account for the hard miles. Conversely, if the vehicle was almost exclusively driven in ideal driving conditions, and has been routinely maintained, the current mileage CM of the vehicle may be decreased to account for the optimal conditions. In the example listed in FIG. 5A, the current mileage CM has been increased to define an adjusted current mileage ACM that is greater than the current mileage.

Once the adjusted current mileage ACM has been determined, an adjusted mileage bracket "AMB" is defined based on the adjusted current mileage ACM. The repairs which fall within the adjusted mileage bracket AMB are then identified. In FIG. 5A, the repairs falling within the adjusted mileage bracket AMB include repairs D1, D2, and D3.

Figure 5B:
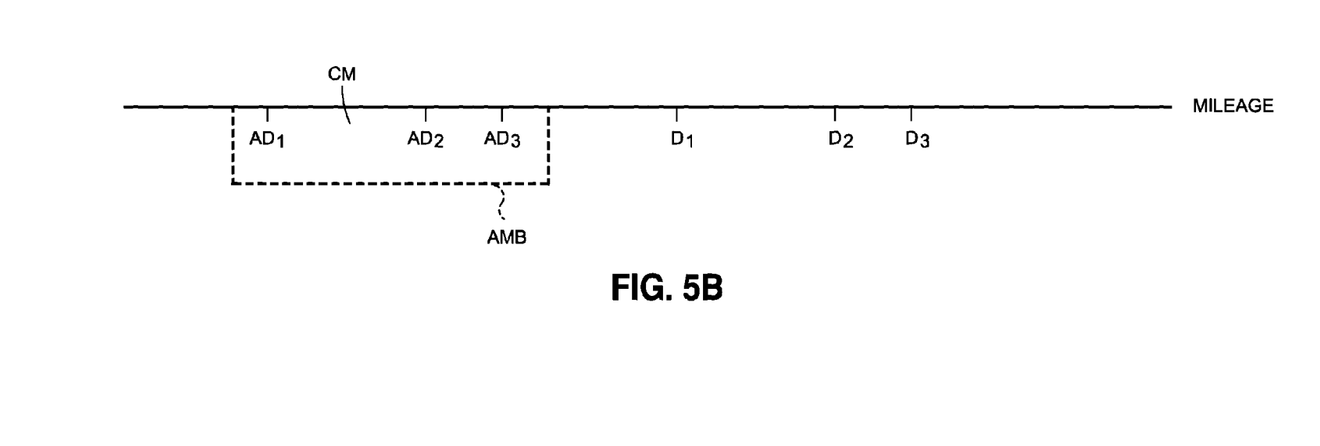
FIG. 5B is a schematic view of adjusting repairs and identifying adjusted repairs within a mileage bracket.

In the example described above in relation to FIG. 5A, the current mileage is adjusted to define an adjusted current mileage to determine the repairs associated with the vehicle. In FIG. 5B, the mileage associated with the repairs is adjusted based on the information received from the vehicle. In other words, the information received from the vehicle may make it more likely that the repairs will occur sooner (i.e., after fewer miles) or later (i.e., after more miles).

After a preliminary assessment, the current mileage CM and repairs D1, D2, D3 may be plotted on the mileage axis. A more detailed analysis may reveal that the effective life of the vehicle is less than the standard or more than the standard. Therefore, the mileage associated with the repairs may be adjusted along the mileage axis, accordingly. When the effective life of the vehicle is more than the standard, the mileage associated with the repairs may be increased, and conversely, if the effective life of the vehicle is less than the standard, the mileage associated with the repairs s may be decreased.

After this analysis, an adjusted mileage bracket AMB may be created to include the current mileage CM of the vehicle. The adjusted repairs AD1, AD2, and AD3 which fall within the adjusted mileage bracket AMB may then be identified.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for determining the cost of operating a vehicle over a defined period comprising:
   a) establishing, on a database, diagnostic data thresholds for establishing a reliable pattern of vehicle failures and an anticipated repairs schedule for a plurality of vehicle types, the anticipated repairs schedule including the approximate mileage at which anticipated future repairs are each expected to become necessary and a repair cost schedule of the anticipated future repairs for the plurality of vehicle types;
   b) configuring a data acquisition and transfer device for establishing a communication link with a vehicle electronic control unit (ECU);
   c) receiving at the data acquisition and transfer device information from the ECU identifying a vehicle type, a present mileage associated with the vehicle and current vehicle condition data;
   d) communicating the retrieved information from the vehicle data acquisition and transfer device to an internet communicable device, and communicating the retrieved information from the internet communicable device to a processor;
   e) using the information received from the ECU identifying the vehicle type, the present mileage associated with the vehicle and the anticipated repair schedule to derive, in the processor, a baseline estimate of anticipated repairs associated with operating the vehicle over the defined future period; and
   f) adjusting the baseline estimate of anticipated repairs based on a comparison of the current vehicle condition data generated by the ECU to the diagnostic data thresholds; and g) displaying the adjusted estimate of anticipated repairs on the internet communicable device.

2. The method as recited in claim 1 wherein the defined period commences upon acquisition of the vehicle.

3. The method as recited in claim 1 wherein the defined period extends from a vehicle acquisition date to a future date when the vehicle reaches a predetermined future mileage.

4. The method as recited in claim 1 wherein the defined period extends from a vehicle acquisition date to a target future date.

5. The method as recited in claim 1 wherein the step of establishing an anticipated repair schedule comprises compiling on the database of historical data respecting repair histories of a plurality of vehicle types, a repair mileage associated with each repair and a repair cost associated with each repair.

6. The method as recited in claim 5 further comprising the steps of:
deriving an estimate of anticipated repair costs associated with the adjusted estimate of anticipated repairs;
adjusting the estimate of future repair costs by deducting the cost associated with anticipated future repairs that were made to the vehicle prior to the commencement of the defined period; and
adjusting the estimate of future repair costs by adding repair costs associated with the anticipated repairs that were scheduled to have been made to the vehicle prior to the commencement of the defined period, but were not made.

7. The method as recited in claim 5 further comprising the steps of:
deriving an estimate of anticipated repair costs associated with the adjusted estimate of anticipated repairs;
defining usage factors representative of an expected vehicle operating environment and conditions of use of the particular vehicle during the defined period;
adjusting the defined period in the response to the usage factors to derive an adjusted defined period; and
using the information identifying a particular type vehicle, the present mileage, the adjusted defined period, the usage factors and the anticipated repairs schedule adjusting the estimate of anticipated repair costs associated with operating the vehicle over the adjusted defined period.

8. The method as recited in claim 7 wherein when the adjusted defined period exceeds the defined period, the step of adjusting the estimate of anticipated repair costs includes adding repair costs associated with repairs scheduled to be made between conclusion of the defined period and the conclusion of the adjusted defined period.

9. The method as recited in claim 7 wherein when the adjusted defined period is less than the defined period, the step of adjusting the estimate of anticipated repair costs includes deducting future repair costs scheduled to be made between the conclusion of the adjusted defined period and the conclusion of the defined period.

10. The method as recited in claim 7 wherein when the adjusted defined period exceeds the defined period, the step of adjusting the estimate of anticipated repair costs includes adding repair costs associated with the repairs scheduled to be made between a mileage associated with the conclusion of the defined period and a mileage associated with the conclusion of the adjusted defined period.

11. The method as recited in claim 7 wherein when the adjusted defined period is less than the defined period, the step of adjusting the estimate of anticipated repair costs includes deducting repair costs scheduled to be made between a mileage associated with the conclusion of the adjusted defined period and a mileage associated with the conclusion of the defined period.

12. The method as recited in claim 7 wherein at least one of the usage factors is derived from information including vehicle location information.

13. The method as recited in claim 7 wherein at least one of the usage factors is derived from information including vehicle anticipated use information.

14. The method as recited in claim 7 wherein at least one of the usage factors is derived from information including current vehicle condition data.

15. The method as recited in claim 7 wherein at least one of the usage factors is derived from recorded driving patterns of a person expected to drive the vehicle.

16. The method as recited in claim 1 wherein step b comprises connecting a data acquisition and transfer device to a diagnostic port of the vehicle to retrieve the vehicle type information and the present mileage information from the vehicle.

17. The method as recited in claim 16 wherein the vehicle type identifying information includes a vehicle identification number (VIN).

18. The method as recited in claim 17 further including the step of deriving the vehicle's make, model, year, and engine information from the vehicle identification number (VIN).

19. The method as recited in claim 16 wherein the vehicle type identifying information includes the vehicle's make, model, year and engine information.

20. The method as recited in claim 16 wherein the data acquisition and transfer device comprises a vehicle scan tool.

21. The method as recited in claim 16 wherein the data acquisition and transfer device comprises a dongle.

22. The method as recited in claim 16 wherein the step of communicating the retrieved information from the vehicle data acquisition and transfer device to the processor comprises communicating the retrieved information from the vehicle data acquisition and transfer device to an Internet communicable device, and communicating the retrieved information from the Internet communicable device to the processor.

23. The method as recited in claim 22 wherein the Internet communicable device comprises a cell phone.

24. The method as recited in claim 22 further comprising the step of displaying the adjusted estimate of anticipated repair costs on the internet communicable device.

25. The method of claim 22 wherein the processor is disposed on the internet communicable device.

26. The method of claim 22 wherein the database is established on the internet communicable device.

27. The method as recited in claim 1 wherein the step of receiving in the processor information identifying the vehicle and a present mileage associated with the vehicle comprises receiving the vehicle information and the present mileage information at website accessible by the processor.

28. The method as recited in claim 1 wherein the step of deriving an estimate of anticipated future repairs comprises compiling a list of actual repairs made to a plurality of different type of vehicles, the list including vehicle mileage associated with the actual repairs, the list being indexable by vehicle type identifying information.

29. The method as recited in claim 28 where the step of deriving an estimate of anticipated repairs includes deriving a schedule of anticipated maintenance activities, and costs associated therewith.

30. The method as recited in claim 1, wherein the current vehicle condition data includes at least one of diagnostic trouble codes, monitor status data, and live data.

31. The method as recited in claim 1 wherein the data acquisition and transfer device comprises an internet communicable device configured to communicate the received information to the processor.

32. The method of claim 31 further comprising the step of displaying the adjusted estimate of anticipated repairs on the data acquisition and transfer device.

* * * * *